April 27, 1937.  R. B. LEWIS  2,078,801
INSERT MECHANISM
Filed Feb. 17, 1934  4 Sheets-Sheet 3
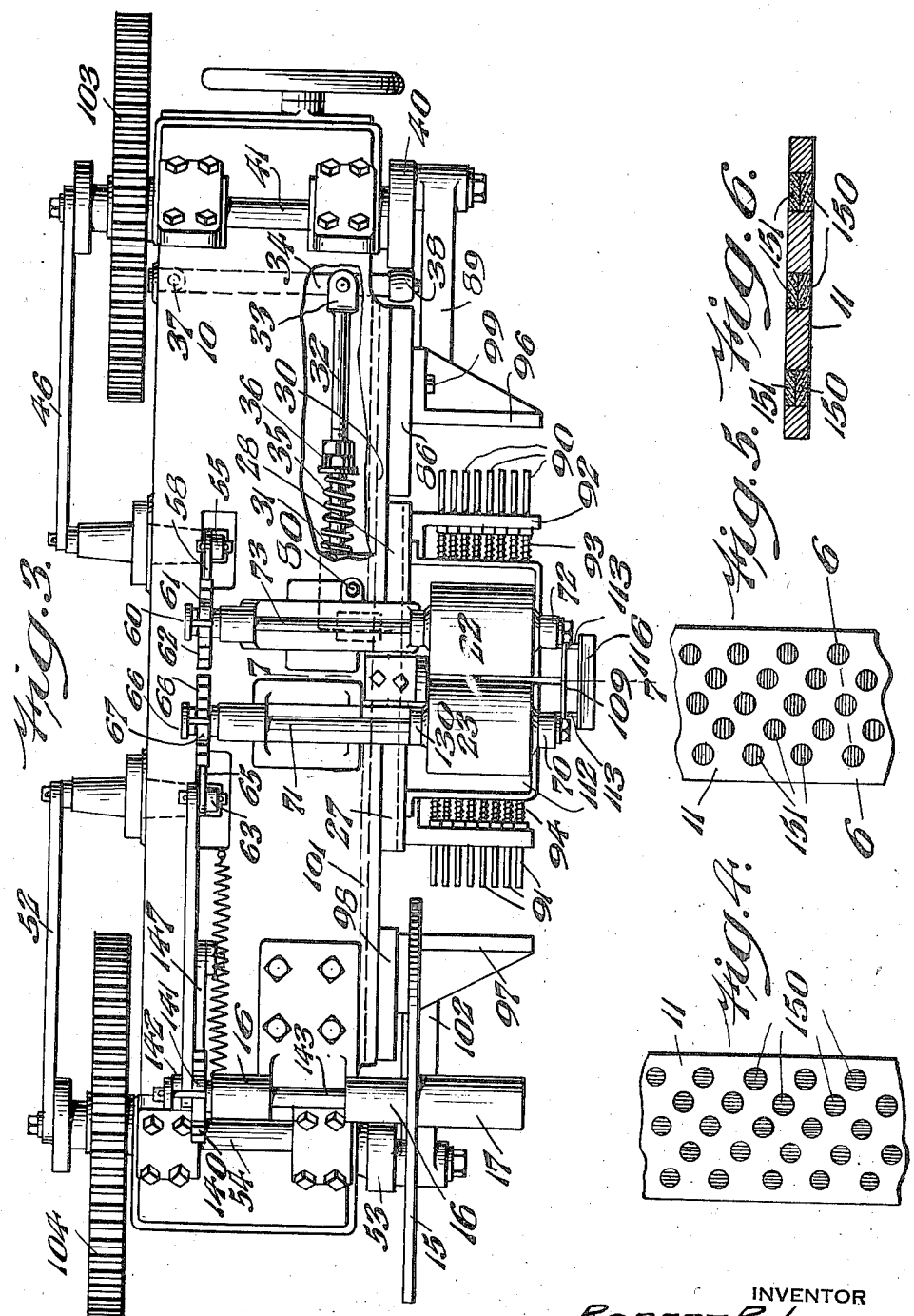
INVENTOR
ROBERT B. LEWIS,
BY Robert M. Barr
ATTORNEY

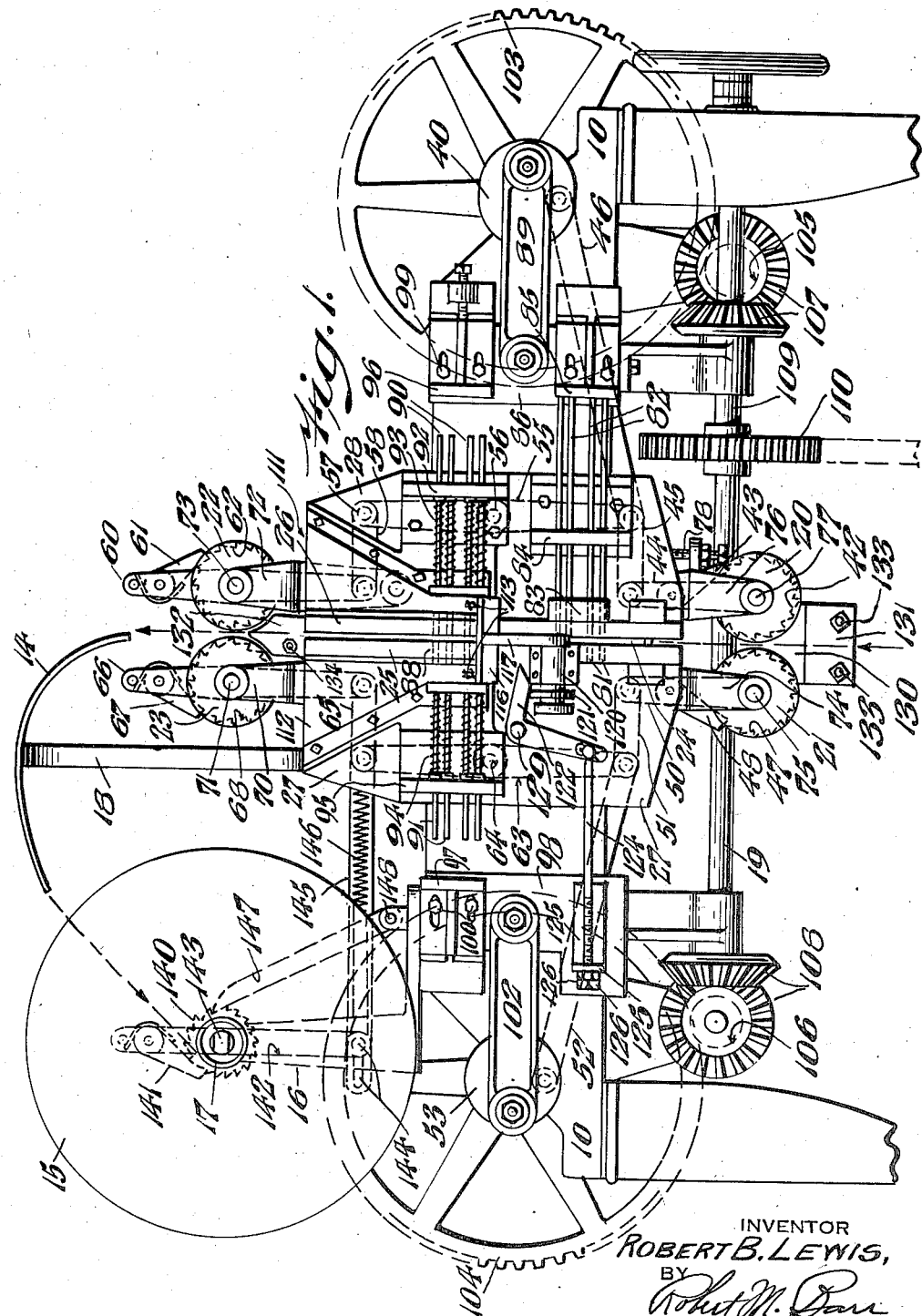

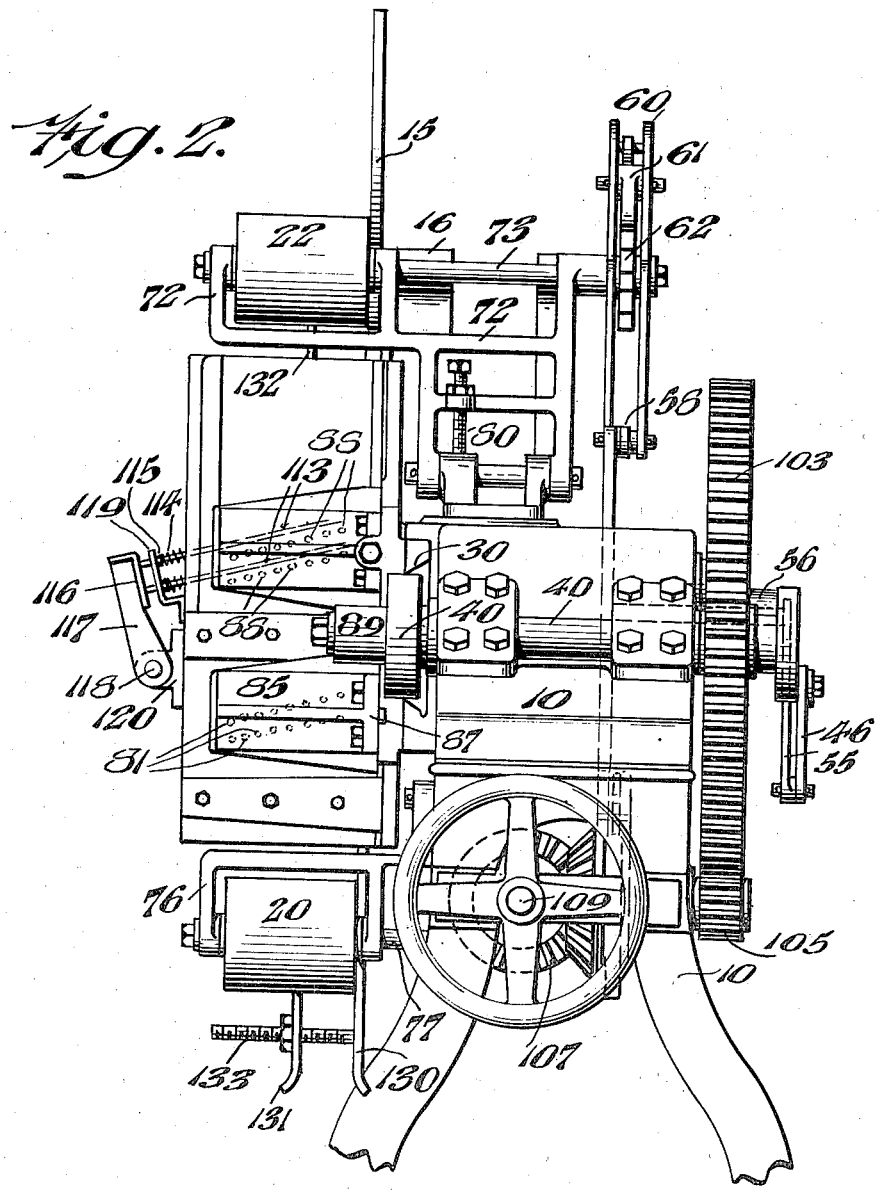

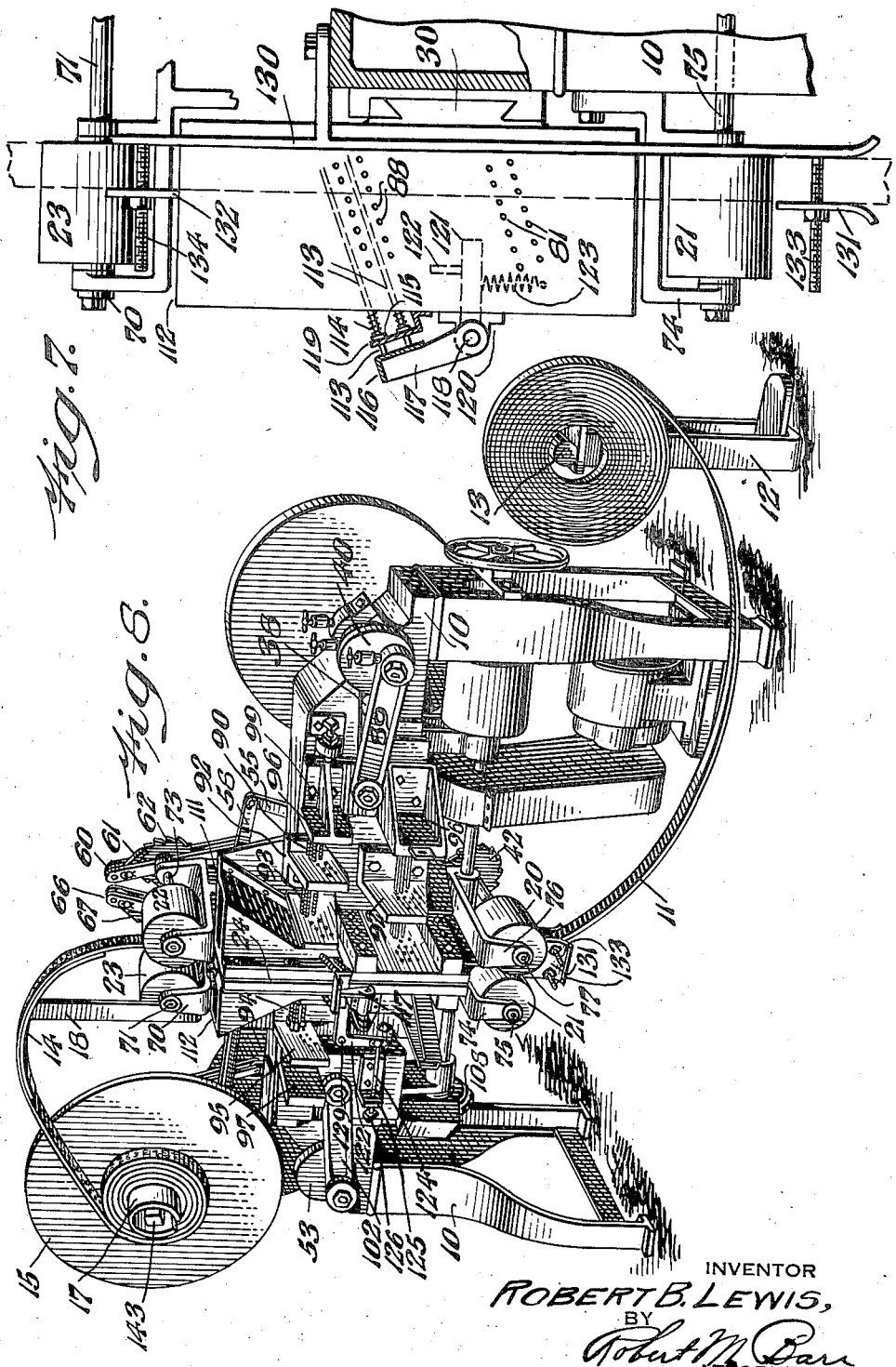

Patented Apr. 27, 1937

2,078,801

UNITED STATES PATENT OFFICE

2,078,801

INSERT MECHANISM

Robert B. Lewis, Philadelphia, Pa., assignor to Tinius Olsen Testing Machine Company, Philadelphia, Pa., a corporation of Pennsylvania Application February 17, 1934, Serial No. 711,815

13 Claims. (Cl. 18—1)

The present invention relates to a machine for so impregnating a piece of material as to form a composite face for work or other purposes.

Some of the objects of the present invention are to provide a mechanism for forming a composite face upon a length of material; to provide a mechanism for embedding an insert in the face of a piece of material to increase the efficiency of the material and to prolong its wearing qualities; to provide a novel mechanism for forming and assembling one or more insert plugs in a piece of material; to provide means for forming plug receiving apertures in a fabric and filling said apertures with a material different from the material of the fabric to produce a composite fabric face; to provide a novel fabric feeding mechanism in association with a punching and filling mechanism wherein the fabric is impregnated with inserts arranged in a predetermined pattern; to provide a novel machine for forming shaped inserts; and to provide other improvements as will hereinafter appear.

In the accompanying drawings Fig. 1 represents a side elevation of an insert forming machine embodying one form of the present invention; Fig. 2 represents an end elevation of the same; Fig. 3 represents a plan of the machine; Fig. 4 represents one face of a strip of material showing insert plugs therein; Fig. 5 represents the opposite face of the strip shown in Fig. 4 with insert plugs of a different color; Fig. 6 represents a section on line 6—6 of Fig. 5; Fig. 7 represents a section on line 7—7 of Fig. 3; and Fig. 8 represents a perspective of the machine.

Referring to the drawings one form of the present invention is shown consisting of a bed frame 10 upon which the operating adjuncts and associated parts are mounted. The purpose of the machine is to form perforations in a strip of fabric 11 such as used for brake linings, belts, or other purposes, and to fill such perforations with material in the form of plugs which may be of graphitic mixture or any other substance which is to serve as a supplemental surface for the respective faces of the fabric. As here shown the fabric 11 comes to the machine in the form of a coil which can be conveniently mounted adjacent thereto so that it can be unwound and fed to the machine as required. In this instance a support 12 is provided and permanently located adjacent the machine having a laterally disposed hanger 13 which is arranged to enter the open central portion of the coil to support the latter so that it can be easily unwound. The fabric 11 passes upwardly through the operating adjuncts of the machine and at the discharge end is arranged to pass over a curved guide 14 in order to be directed to a reel 15 conveniently located adjacent thereto. The reel 15 is rotatably mounted on a standard 16 which is fixed at its lower end to the frame 10 and is preferably in the form of a disc having a winding drum 17 coaxially arranged with respect thereto. The guide 14 is permanently mounted upon a post 18 or the like in such a position that the discharging end of the fabric 11 initially rides thereon in the plane of its passage through the machine so that at no time during the feeding operation is there opportunity for the fabric to be improperly deflected from its course or from its desired relative position with respect to other parts of the machine. The feeding of the fabric 11 through the machine is accomplished in the present instance by the provision of a pair of friction rollers 20 and 21 at the inlet end of the machine and a like pair of friction rollers 22 and 23 at the discharge end of the machine, which rollers are arranged to be operated by a step by step mechanism as will be later described.

For positioning the fabric 11 in the machine in proper relation to the operating adjuncts so that the required punching and plug inserting operation can be accurately carried out, a guide way 24 is formed by two jaw plates 25 and 26 arranged opposite and parallel, the former being a part of a back plate 27 which is fast to the bed frame 10, and the latter a part of a back plate 28 which is mounted in horizontally disposed ways 30 of the frame 10. The two back plates 27 and 28 mount the jaw plates 25 and 26 in vertical parallel relation. Since the back plate 28 with its plate 26 can be moved relative to the plate 25, the general function is that of a vise cooperating with the fabric. The action of this vise member is to hold the fabric 11 against movement during part of the operating cycle of the machine, and to release it during other portions of the cycle so that the fabric 11 can be fed, stopped, and resume feeding in the required manner. This reciprocation of the back plate 28 with its attached jaw plate 26 is brought about by means of a boss 31 preferably formed integral with the plate parts and having a rod 32 threaded therein and extending lengthwise of the machine to a suitable location where it terminates in a bifurcated end 33 which is pivotally pinned to an operating arm 34. The rod 32 is encircled by a coil spring 35 which is placed under compression by resting at one end against the face of the boss 31 and at the other end against a lock-nut construction 36 which is threaded upon the rod 32 at a suitable place intermediate the ends thereof. The action of the spring 35 is to cause the rod 32 to move endwise in a direction so that the jaw plate 26 is normally in its open position with respect to the jaw plate 25. In order to shift the plate 26 to its gripping position the arm 34 is pivoted at 37 and carries on its free end a roller 38 held in face contact with a cam 40 rotatably mounted upon a driven shaft 41. As will later appear this driven shaft 41 is preferably also used to control other movable adjuncts of the apparatus and the relation of which to the jaw movement is properly timed in the cycle of operations.

For the purpose of giving the fabric 11 its forward feeding movement in step with the opening of the plates 25 and 26, the friction roller 20 is provided with a ratchet 42 arranged to be operated by a spring pressed pawl 43 pivoted upon a rock lever 44 which is connected by a link 45 with a connecting rod 46 operated by the crank of the cam 40. The friction roller 21 is likewise provided with a ratchet 47 and pawl 48, which is operated by a rock lever 50, link 51 and connecting rod 52, which latter extends in the opposite direction from the rod 46 to connect with a crank disc 53 which is fast to a driven shaft 54 which parallels the shaft 41 but at the opposite end of the machine. The motion of the connecting rod 46 is also utilized to rock an arm 55 which is pivoted at 56 and has its other end connected at 57 to a link 58 whereby a pawl supporting arm 60 is operated to actuate a pivoted spring pressed pawl 61 for cooperation with a ratchet 62 fast to the friction roller 22. Likewise the connecting rod 52 is utilized to rock arm 63 which is pivoted at 64 and has its upper end connected to a link 65 leading to pivoted pawl lever 66 which carries on its free end a pivoted spring pressed pawl 67 interconnecting with a ratchet 68 to rotate the friction roller 23. The operating adjuncts of the rollers 20 and 21 operate to rotate the rollers respectively in opposite directions so that the fabric is fed upwardly into the guide way 24. Similarly the rollers 22 and 23 are oppositely rotated to continue the feeding of the fabric out of the machine as suitable bracket 70 forms a support bearing for the shaft 71 of the roller 23. An adjustable bracket 72 forms bearings for the shaft 73 of the roller 22. A bracket 74 forms a bearing for the shaft 75 of the roller 21, and an adjustable bracket 76 forms a bearing for the shaft 77 of the roller 20. An adjusting screw 79 operating against a fixed part serves to adjust the roller 20 operatively with respect to the roller 21 so that the proper frictional engagement can take place. A like adjusting screw 80 is provided in conjunction with the bracket 72 in order to properly locate the friction roller 22 with respect to the roller 23.

From the foregoing it will be evident that as the shafts 40 and 41 rotate in synchronism there will be a simultaneous step by step operation of the two pairs of feed rolls with the result that the fabric 11 will travel through the way 24 with a succession of stops in order that certain operations now to be described can take place during the rest periods of the fabric.

As a means for perforating the fabric with one or more holes, or with holes in a predetermined pattern, the two vise plates 25 and 26 are drilled laterally at a convenient location preferably near the receiving end of the way 24 and these holes 81, so formed register one with the other and also with punches 82. These punches 82 are mounted for sliding movement in guide blocks 83 and 84, the former being attached to the plate 26 and the latter fixed to the plate 28. The other ends of the punches 82 are fastened to a tool holder plate 85 which is bolted or otherwise made fast to a reciprocable head 86 mounted for sliding movement in ways 87 of the main frame 10. With the fabric in place in the guideway 24, and held by the vise plates 25 and 26, a forward movement of the punch holder 85 will cause the punches 82 to pass through the fabric and leave one or more clean cut holes as the case may be, while the punchings are ejected through the plate 25 by the full stroke of the punch 82 and can be directed into any suitable collecting receptacle.

In order to fill the perforations or holes in the fabric made by the punches 82, the latter passes into register with a plurality of holes 88 formed respectively in the opposed faces of the plates 25 and 26, all of the holes in one plate being respectively in register with the holes in the other plate. Filling plungers 90 and 91 are arranged in two groups also registering respectively with the holes 88 but spaced by the vise members 25 and 26 so that the plungers 90 and 91 approach the fabric 11 from opposite sides. The plungers 90 are suitably guided in brackets 92 and are normally withdrawn from the holes 88 by springs 93. Likewise the plungers 91 at the opposite side are held withdrawn from the holes 88 by coil springs 94 and are suitably guided in a plate 95. Motion is transmitted to the two groups of plungers 90 and 91 by the simultaneous approaching movement of two presser plates 96 and 97, caused in the case of plate 96 by the reciprocation of the head 86, and in the case of the plate 97 by the reciprocation of a second reciprocable head 98. The plates 96 and 97 are respectively made fast to the heads 86 and 98 by bolts 99 and 100. The head 98 is mounted for sliding movement in suitable ways 101 of the frame 10 and receives its motion by means of a crank arm 102 connected to the crank disc 53 of the shaft 54. The two shafts 41 and 54 are synchronously driven respectively by gears 103 and 104 through pinions 105 and 106 operating through two beveled gear trains 107 and 108 from a common driven shaft 109. The shaft 109 is driven by a gear 110 from a suitable source of power.

For the purpose of supplying plug or insert material to fill the aforesaid holes in the fabric 11, two vertically arranged hoppers 111 and 112 are respectively located at the upper ends of the two plates 27 and 28, each having an inclined bottom wall which serves to converge its contents downwardly toward the lower end through which the plunger members are arranged to pass as they reciprocate toward and away from the fabric 11. The plate 25, as here shown, forms one side of the hopper 112, and the plate 26 forms the corresponding side of the hopper 111 and the filling plungers 90 and 91 pass freely through the sides of the bottom portion of each hopper thereby forcing the material through the holes in the plates 25 and 26 and into the perforations in the fabric 11 so that the latter are filled under pressure and the plugs so formed fill the holes previously punched in the fabric.

Preferably it is desirable to provide an agitating device for keeping the material loose and in condition to feed easily to the lower end of the hoppers to take a position between the holes in the hopper and the two sets of punches, and therefore agitator rods 113 enter the respective hoppers to pass transversely across between the plungers within the area occupied by the filling material. These rods 113 protrude from the side of the hopper and are guided in a bracket 119 and are normally held at the end of a working stroke by springs 114 coiled respectively about the rods 113 and which are held under compression between the outer hopper wall and collars 115 fixed respectively upon the rods 113. The working stroke of the agitator rods, in the direction opposite to the action of the springs, is brought about by the rocking movement of a rigid strip 116 which is arranged to intercept the rods 113 and shift them transversely across the interior of the two hoppers. The strip 116 is carried by an arm 117 fixed to a pivot pin 118 which is freely rotatable in a bearing 120 and receives a rocking movement imparted by a lever arm 121. The free end of this arm 121 is normally pressed into contact with a bell crank 122 by a compression spring 123 suitably mounted for the purpose. The bell crank 122 is pivoted at 129 and has its operating arm connected to a laterally arranged rod 124 which passes through a pick-up bracket 125 fast to the reciprocable head 98. The rod 124 terminates in a nut 126 or other tappet forming means to be engaged and shifted by the movement of the bracket 125 in one direction, and therefore the length of the rod 124 is such as to permit the proper relative movement of the head 98 and the bracket 125 before the two are caused to move together to operate the agitator rods 113.

For preventing relative displacement of the fabric 11 as it is fed vertically through the way 24, a guide strip 130 is fixed to the frame 10 to parallel the edges of the vise plates 25 and 26 and to overlap the guide way 24 throughout its length. The arrangement is such that the strip 130 lies substantially flush with the plane of the plate edges at one side and thus provides a vertical guide against which one edge of the fabric 11 rides in its movement. The opposite edge of the fabric rides against two guides 131 and 132 located respectively at the bottom and top of the way 24 and all adjustable towards and away from the strip 130 to conform to fabrics of different width. Thus in the case of the guide 131, two adjusting bolts 133 project laterally from the bottom of the strip 130 and space the guide 131 from the strip 130 in accordance with the width of the fabric to be used. Likewise an adjusting bolt 134 projects laterally from the strip 130 adjacent the discharge end of the way 24 and adjustably mounts the guide 132 in spaced relation from the strip 130. Since the guides 131 and 132 are located the same distance from the strip 130 for a given width of fabric, the latter is held in perfect vertical alinement as it passes through the way 24 and the punching and filling operations take place with the desired regularity of arrangement.

In the present instance the reel 15 is given a step-by-step movement by means of a ratchet 140 and pawl 141, the latter being of the spring pressed type and pivoted to a rock lever 142 which in turn is pivoted to the fixed shaft 143 about which the reel drum 17 rotates. The lever 142 has a pin and slot connection 144 with a link 145 which receives a reciprocating motion through pivotal connection with the arm 63. A spring 146 is stretched between the arm 142 and the frame 10 in order to operate the pawl 141 on its working stroke and to maintain the necessary tension upon that pawl. A drag pawl 147 is pivoted to the frame 10 at 148 to ride upon the ratchet 140 to prevent improper unwinding or release of the winding drum.

In the preferred form of the machine two substance delivering hoppers are employed being spaced by the path of the strip to be plugged, and the substance from both hoppers being plugged into the holes in the strip of material by plungers working from opposite sides of the strip. This is a very effective way of plugging the holes in the strip and it also lends itself to using two substances one of a color different from the other so that the plugs on one side appear as inserts of one color, while the plugs on the opposite side appear as inserts of another color. Broadly speaking, however, the machine is capable of functioning with but one hopper and one set of punches and plugs, and when so used the material is plugged from one side only.

In the operation of the machine the hoppers are filled with a substance to be used as inserts or plugs and the strip of material having been placed upon the stationary support 12, it is passed up through the feed rolls 20 and 21, through the passage-way 24, out of the feed rolls 22 and 23, and over the guide 14, where its end is attached to the winding reel. Preferably at the start of operations a lead-in strip is attached to the main strip so that the plugging of the strip of material will take place at the very beginning of its length. When the strip has advanced to a point opposite the punching mechanism the cycle of operations is such that the punches are advanced to pass through the guide holes and pass into or through the material as the case may be. At the instant the punches reach a position to engage the strip of material the step-by-step mechanism is in its rest position and the vise plate 26 has been advanced by the crank arm 89 to clamp the strip against movement during the punching operation When this operation is complete the step-by-step feed continues and another punching operation takes place when the receiving holes in the material, which have been provided by the punches, come into register with the hopper discharge holes. The forward movement of the plungers 93 and 94 then causes the substance to be plugged into the holes from both sides, or in case the hole has not been punched clear through the material, the punches from one side will plug that side only. The step-by-step mechanism is so timed in the cycle of operations as to bring the holes in the strip into register with the hopper holes after each forward feeding of the strip, and the operation continues with successive holes in the strip being brought into alignment with the plunger mechanism so that the entire strip is provided with face inserts arranged in any desired order or design. It should also be noted that the substance in the hoppers is kept free to flow down into the space in the holes of the strip and the ends of the plungers by operation of the agitator rods 113 which are brought into operation as the head 98 reciprocates under the action of the crank arm 102. Thus the bell crank 129 is moved clock-wise to operate the agitators in one direction by the movement of the head 98 to the left (as seen in Fig. 1) and when this latter returns the spring 123 causes the bell crank to return to its former position and thus allow the agitators 113 to be retracted by the springs 114.

The present invention also contemplates a modified operation by reversing the direction of the strip feeding means and bringing a perforated strip past the hoppers where its perforations are plugged with the desired substance and then the formed plugs can be ejected by the punches. By this operation the machine can be used to form pills, pellets, or any other shaped articles capable of being molded in a preformed hole.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. In a machine of the character stated, a hopper for an insert substance having a substance delivery hole therein, a plunger arranged to traverse said hopper to expel substance by way of said hole, a second hopper for an insert substance juxtaposed with respect to said first hopper and having a substance delivery hole therein, a plunger arranged to traverse said second hopper to expel substance through the hole therein, means to position a perforated strip of material so that the holes therein and hopper holes register, and means for actuating said plungers to plug said holes with substance from said hoppers.

2. In a machine of the character stated, a hopper for an insert substance having a substance delivery hole therein, a plunger arranged to traverse said hopper to expel substance by way of said hole, a second hopper for an insert substance juxtaposed with respect to said first hopper and having a substance delivery hole therein registering with the hole of said first hopper, a plunger arranged to traverse said second hopper to expel substance through the hole therein, means to position a strip of material having a hole therein to cause said hole to register with said hopper holes, and means to operate said plungers to cause said strip hole to be plugged with said substance from opposite sides.

3. In a machine of the character stated, a hopper for an insert substance having a substance delivery hole therein, a plunger arranged to traverse said hopper to expel substance by way of said hole, a second hopper for an insert substance juxtaposed with respect to said first hopper and having a substance delivery hole therein registering with the hole of said first hopper, a plunger arranged to traverse said second hopper to expel substance through the hole therein, means to intermittently move a strip of material having a series of holes therein so that said holes are successively brought into register with said hopper holes, and means to cause said plungers to plug each strip hole from opposite sides with said substance as each hole comes into register with said hopper holes.

4. In a machine of the character stated, a hopper for an insert substance having a substance delivery hole therein, a plunger arranged to traverse said hopper to expel substance by way of said hole, a second hopper for an insert substance juxtaposed with respect to said first hopper and having a substance delivery hole therein registering with the hole of said first hopper, a plunger arranged to traverse said second hopper to expel substance through the hole therein, means to intermittently move a strip of material having a series of holes therein so that said holes are successively brought into register with said hopper holes, means to cause said plungers to plug each strip hole from opposite sides with said substance as each hole comes into register with said hopper holes, and means to hold said strip against movement during said plugging operation.

5. In a machine of the character stated, a hopper for an insert substance having a substance delivery hole therein, a plunger arranged to traverse said hopper to expel substance by way of said hole, a second hopper for an insert substance juxtaposed with respect to said first hopper and having a substance delivery hole therein registering with the hole of said first hopper, a plunger arranged to traverse said second hopper to expel substance through the hole therein, means to intermittently move a strip of material having a series of holes therein so that said holes are successively brought into register with said hopper holes, means to cause said plungers to plug each strip hole from opposite sides with said substance as each hole comes into register with said hopper holes, means to hold said strip against movement during said plunger operation, and means for maintaining said strip in a predetermined path of movement and including members adjustable to different widths of said strip.

6. In apparatus for plugging brake linings, punches, rams, means to actuate said punches and rams, intermittent feeding means for advancing a strip of brake lining successively to said punches and rams, and means for supporting plugging material in alignment with the rams to be forced by the rams into the punch-formed openings of the strip, said rams comprising two groups, each ram of each group opposing a ram of the other group, the operating means for the rams comprising means for oppositely moving said groups.

7. In apparatus for plugging brake linings, a series of reciprocable pins, including punches and rams, means to support a strip of brake lining for operations by said punches and rams, means to advance the strip over the supporting means in steps of such length that openings formed by the punches subsequently align with the rams, and means to support plugging material in alignment with the rams to be forced into the openings of the strip, said rams comprising two groups, each ram of each group opposing a ram of the other group, the operating means for the rams comprising means for oppositely moving said groups.

8. In apparatus for plugging brake linings, punches, rams, means to actuate said punches and rams, intermittent feeding means for advancing a strip of brake lining successively to said punches and rams, means for supporting plugging material in alignment with the rams to be forced by the rams into the punch-formed openings of the strip, and means for clamping the strip intermediate advances thereof by said feeding means, said rams comprising two groups, each ram of each group opposing a ram of the other group, the operating means for the rams comprising means for oppositely moving said groups.

9. In apparatus for plugging brake linings, a series of reciprocable pins, including punches and rams, means to support a strip of brake lining for operations by said punches and rams, means to advance the strip over the supporting means in steps of such length that openings formed by the punches subsequently align with the rams, means to support plugging material in alignment with the rams to be forced into the openings of the strip, and means for clamping the strip intermediate advances thereof by said feeding means, said rams comprising two groups, each ram of each group opposing a ram of the other group, the operating means for the rams comprising means for oppositely moving said groups.

10. In apparatus for plugging brake linings, punches, rams, means to actuate said punches and rams, intermittent feeding means for advancing a strip of brake lining successively to said punches and rams, said rams comprising two groups, each ram of each group opposing a ram of the other group, the operating means for the rams comprising means for simultaneously oppositely moving said groups, and means to interpose plugging material between said ram groups.

11. In apparatus for plugging brake linings, punches, rams, means to actuate said punches and rams, intermittent feeding means for advancing a strip of brake lining successively to said punches and rams, said rams comprising two groups, each ram of each group opposing a ram of the other group, the operating means for the rams comprising means for simultaneously oppositely moving said groups, means to interpose plugging material between said ram groups, and a hopper for plugging material associated with each group of rams and through which the groups operate.

12. In apparatus for plugging brake linings, a series of rams, means to feed a strip of perforated brake lining by the rams in a manner aligning the perforations of the strip with said rams, means to actuate said rams, and means for supporting plugging material in alignment with the rams to be forced between the rams into the openings of the strip, said rams comprising two groups, each ram of each group opposing a ram of the other group, the operating means for the rams comprising means for oppositely moving said groups.

13. In apparatus for plugging brake linings, a series of reciprocable pins including punches and rams, means to support a strip of brake lining for operations by said punches and rams, means to advance the strip over the supporting means in such manner that openings formed by the punches subsequently align with the rams, and means to support plugging material in alignment with the rams to be forced into the openings of the strip, said rams comprising two groups, each ram of each group opposing a ram of the other group, the operating means for the rams comprising means for oppositely moving said groups.

ROBERT B. LEWIS.